United States Patent [19]
Haddox

[11] Patent Number: 5,121,944
[45] Date of Patent: * Jun. 16, 1992

[54] ADJUSTABLE MUD FLAP ASSEMBLY

[76] Inventor: John Haddox, 2370 S. Maple Grove, Boise, Id. 83709

[*] Notice: The portion of the term of this patent subsequent to Jun. 25, 2008 has been disclaimed.

[21] Appl. No.: 680,346

[22] Filed: Apr. 4, 1991

Related U.S. Application Data

[63] Continuation-in-part of Ser. No. 431,083, Nov. 3, 1989, Pat. No. 5,026,094.

[51] Int. Cl.⁵ .............................................. B62D 25/16
[52] U.S. Cl. ..................................... 280/848; 280/851
[58] Field of Search ............... 280/847, 848, 851, 155; 248/231.4, 231.7

[56] References Cited

U.S. PATENT DOCUMENTS

| | | | |
|---|---|---|---|
| 3,877,722 | 4/1975 | Conner | 280/154 |
| 4,572,532 | 2/1986 | Early et al. | 280/851 |
| 4,740,003 | 4/1988 | Antekeier | 280/848 |
| 5,026,094 | 6/1991 | Haddox | 280/848 |

Primary Examiner—Andres Kashnikow
Assistant Examiner—Richard Camby
Attorney, Agent, or Firm—Frank J. Dykas; Craig M. Korfanta; Ken J. Pedersen

[57] ABSTRACT

An adjustable mud flap assembly (10) which utilizes the transverse bar member (6) of a trailer hitch assembly (5) as the main support for the mud flaps. Mud flap assembly (10 and 11) has a pair of right and left L-shaped mud flap frame members being removably attached to the ends of the transverse bar member (6). Each L-shaped mud flap frame generally has a rectangular mud flap (12 or 22) removably attached thereto. By varying the radial disposition of the L-shaped mud flap frame member with respect to the transverse bar member (6), the position of the mud flap with respect to vehicle (1) can be changed. Additionally, utilizing the transverse bar member (6) of the hitch assembly (5) as the support base for mud flap assembly (10), necessarily requires that mud flaps (12 and 22) be positioned at the rear of vehicle (1). This disposes mud flaps (12 and 22) in the trajectory path of any projectile destined for the trailer 3.

2 Claims, 8 Drawing Sheets

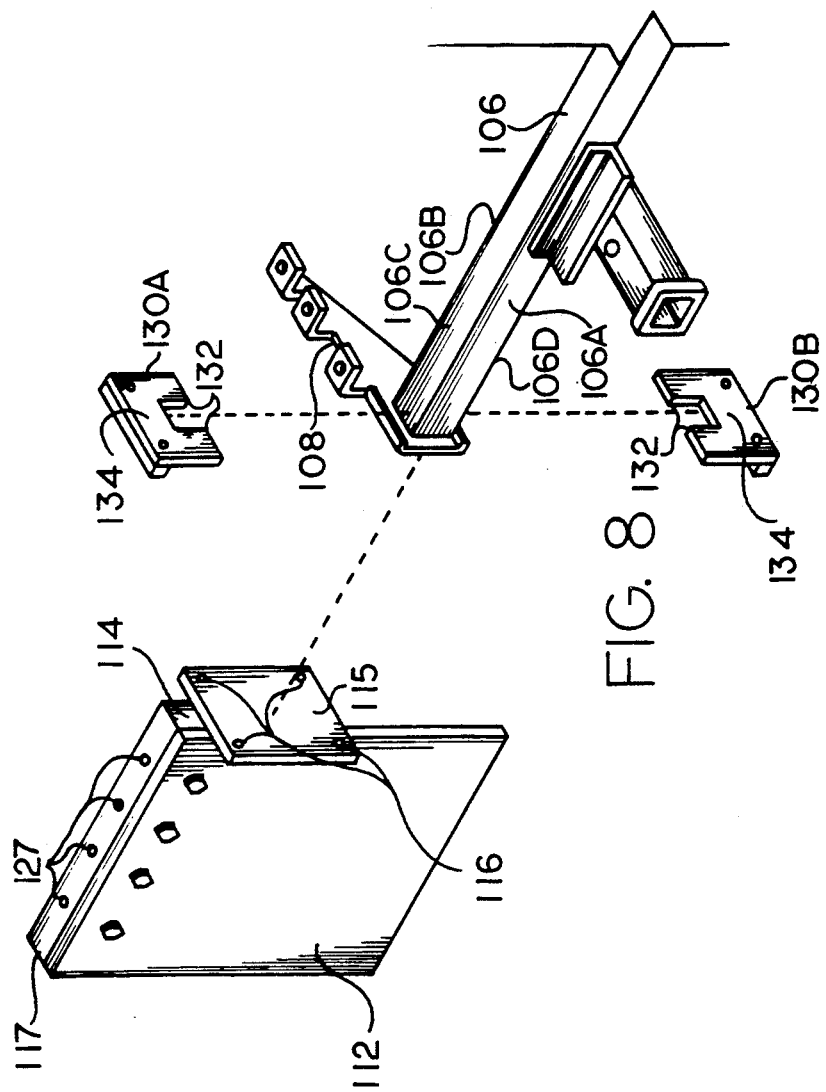

ADJUSTABLE MUD FLAP ASSEMBLY

PRIORITY

This is a continuation-in-part of application Ser. No. 07/431,083, filed Nov. 3, 1989 now U.S. Pat. No. 5,026,094.

DESCRIPTION

BACKGROUND OF THE INVENTION

1. Technical Field

This invention generally relates to mud flaps for vehicles and in particular, it relates to a mud flap assembly which utilizes the transverse bar member of a trailer hitch as a mount and support for adjustable position mud flaps.

2. Background Art

Mud flaps are normally permanently attached within a few inches rearward of the rear wheels of a vehicle and serve to protect the rear quarter panels of the vehicle from flying debris such as mud and rocks. The mud flaps are necessarily positioned to hang a few inches off the ground to prevent them from coming in contact with the ground during rough road travel. While the mud flaps do protect the rear quarter panels of the vehicle from flying debris, because they are suspended a distance above the ground they do not prevent projectiles propelled by the vehicle wheels from impinging upon a trailer towed behind the vehicle. This phenomena is graphically depicted in FIG. 1.

Additionally, the mud flaps are frequently torn from their mounting assemblies when operating the vehicle in reverse. Because the flaps are positioned in close proximity to the rear wheels, they can easily be pinched between an object protruding from the ground, such as a curb, and the tire of the vehicle.

Depending upon whether the vehicle is towing a trailer or is heavily loaded with cargo and/or passengers, the distance between the ground and the mud flaps can vary greatly. Hence, the mud flaps have to be shortened to prevent them from dragging on the ground. This means that when the vehicle is unloaded and not in tow, the mud flaps are disposed at an undesirable height above the ground.

What is needed is an adjustable mud flap assembly which can be used in addition to or in lieu of the standard mud flaps previously mentioned which prevents projectiles from the vehicle wheels from impinging upon a tow trailer.

DISCLOSURE OF INVENTION

These and other objects are accomplished by an adjustable mud flap assembly which utilizes the transverse bar member of the trailer hitch assembly as the main support for the mud flaps. The mud flap assembly of the present invention has right and left L-shaped mud flap frame members which are removably attachable to the ends of the transverse bar member. Each L-shaped mud flap frame generally has a rectangular mud flap removably attached thereto. By varying the radial disposition of the L-shaped mud flap frame member with respect to the transverse bar member, the position of the mud flap with respect to the vehicle can be changed. Utilizing the transverse bar member of the hitch assembly as the support base for the mud flap assembly necessarily requires that the mud flaps be positioned at the rear of the vehicle. This disposes the mud flaps directly in the trajectory path of any projectile destined for the trailer. This advantage is graphically depicted in FIG. 2.

In a first embodiment, &he removable attachment means are configured to attach the L-shaped mud flap frames in one of a plurality of radial dispositions with respect to a transverse bar member having a square hollow tubular open end further supported by a transverse bar support member.

This is accomplished through the use of an attachment plate having a plurality of annularly spaced holes and a transverse bar receiving stub which is formed of a square metal tube having outside dimensions sized to be closely received by a hollow square transverse bar member. Said attachment plate and transverse bar receiving stub are held in place by a u-shaped clamping member.

The annularly spaced holes in the attachment plate allow the position of the mud flap with respect to the vehicle and wheel to be varied. For example, when towing a heavy trailer with a fully loaded vehicle, one would have the mud flap frame positioned in a 90 degree orientation from horizontal. This disposes the mud flap at its highest point off the ground. Analogously, a 270 degree orientation of the mud flap frame will dispose the mud flap at its lowest point with respect to the ground. The 0 degree and 180 degree orientations correspond to intermediate points which dispose the mud flap at an intermediate point off of the ground and either rearward or forward of the 90 degree and 270 degree orientations.

In a second embodiment, the removable attachment means are configured to attach the L-shaped mud flap frames in one of a plurality of radial dispositions with respect to a transverse bar member which does not have a hollow open end.

This is accomplished through the use of an attachment plate having a plurality of annularly spaced attachment holes and a clamping assembly composed of an upper and lower clamping member. Two attachment holes are provided in the rear closed section of each of the clamping members for cooperating with said attachment holes of said attachment plate.

Mud flap height in this second embodiment may be accomplished by radially orienting the mud flap frame, as described for the first embodiment.

BRIEF DESCRIPTION OF THE DRAWINGS

FIG. 8 is an exploded view of the left upright frame member of the second embodiment including the attachment plate and clamping assembly.

BEST MODE FOR CARRYING OUT INVENTION

Figure 1:
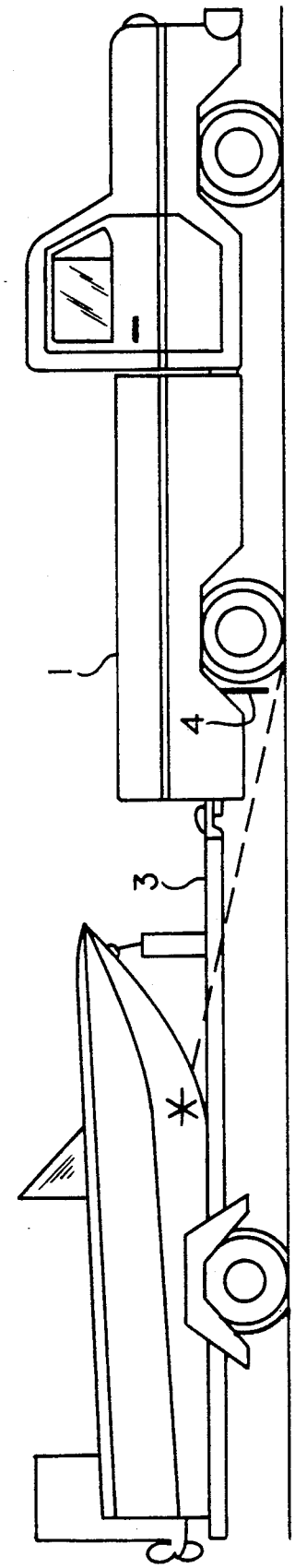
FIG. 1 is a side representational view of the prior art mud flap position.
Figure 2:
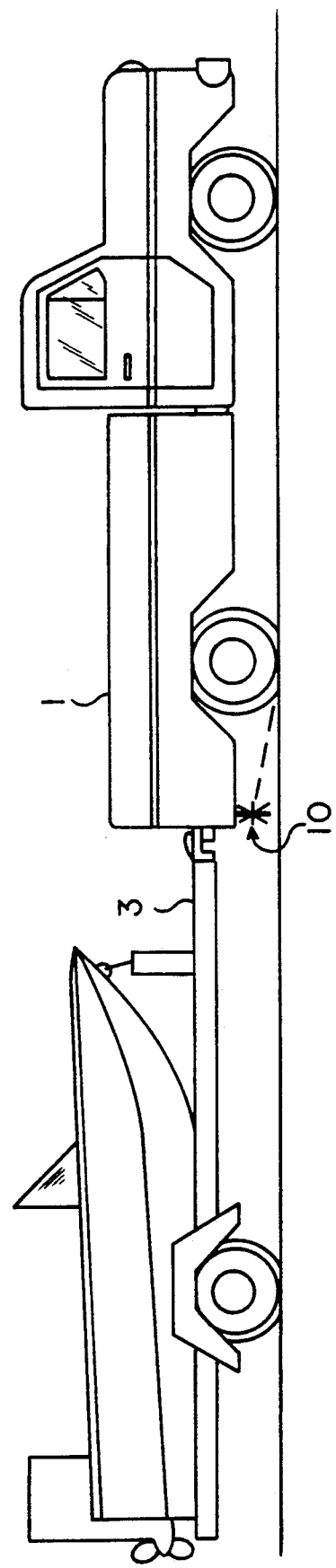
FIG. 2 is a side representational view of the present invention demonstrating the rearward placement of the mud flaps on the vehicle.
Figure 3:
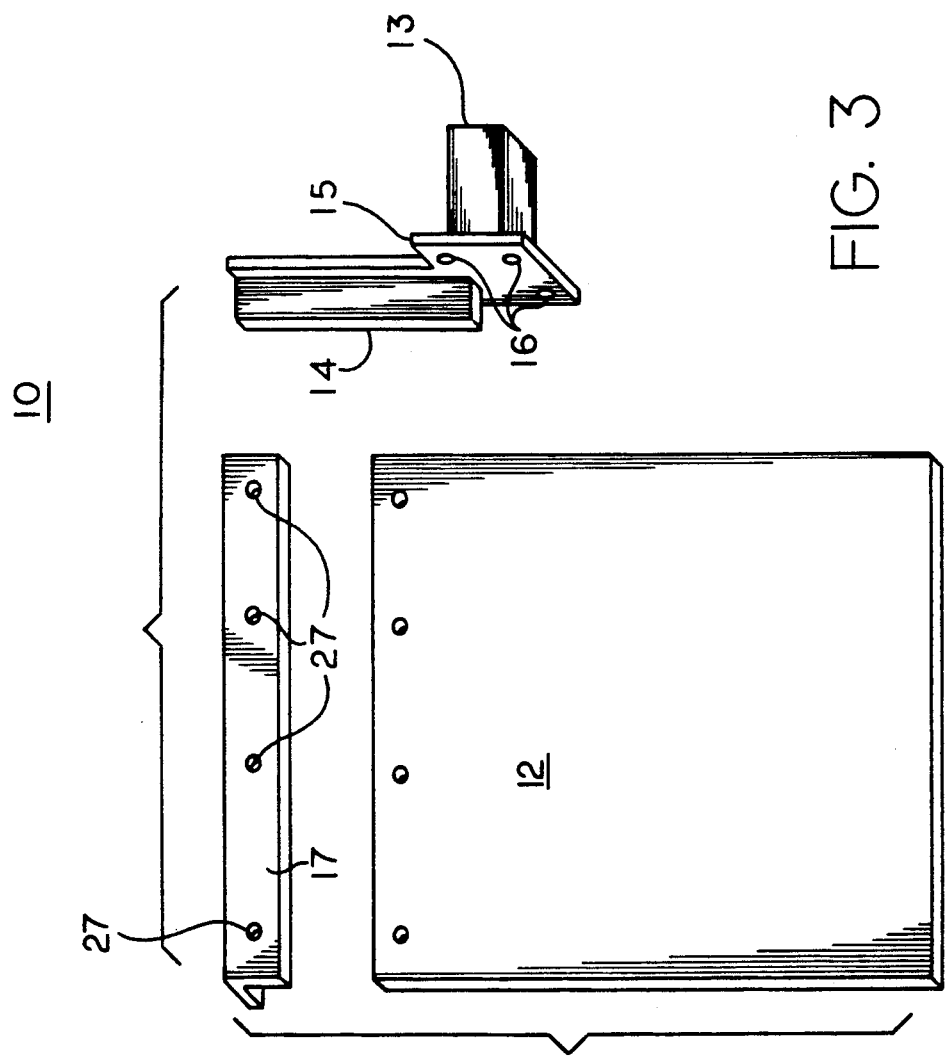
FIG. 3 is an assembly perspective drawing of the first embodiment of the left mud flap frame and mud flap.
Figure 4:
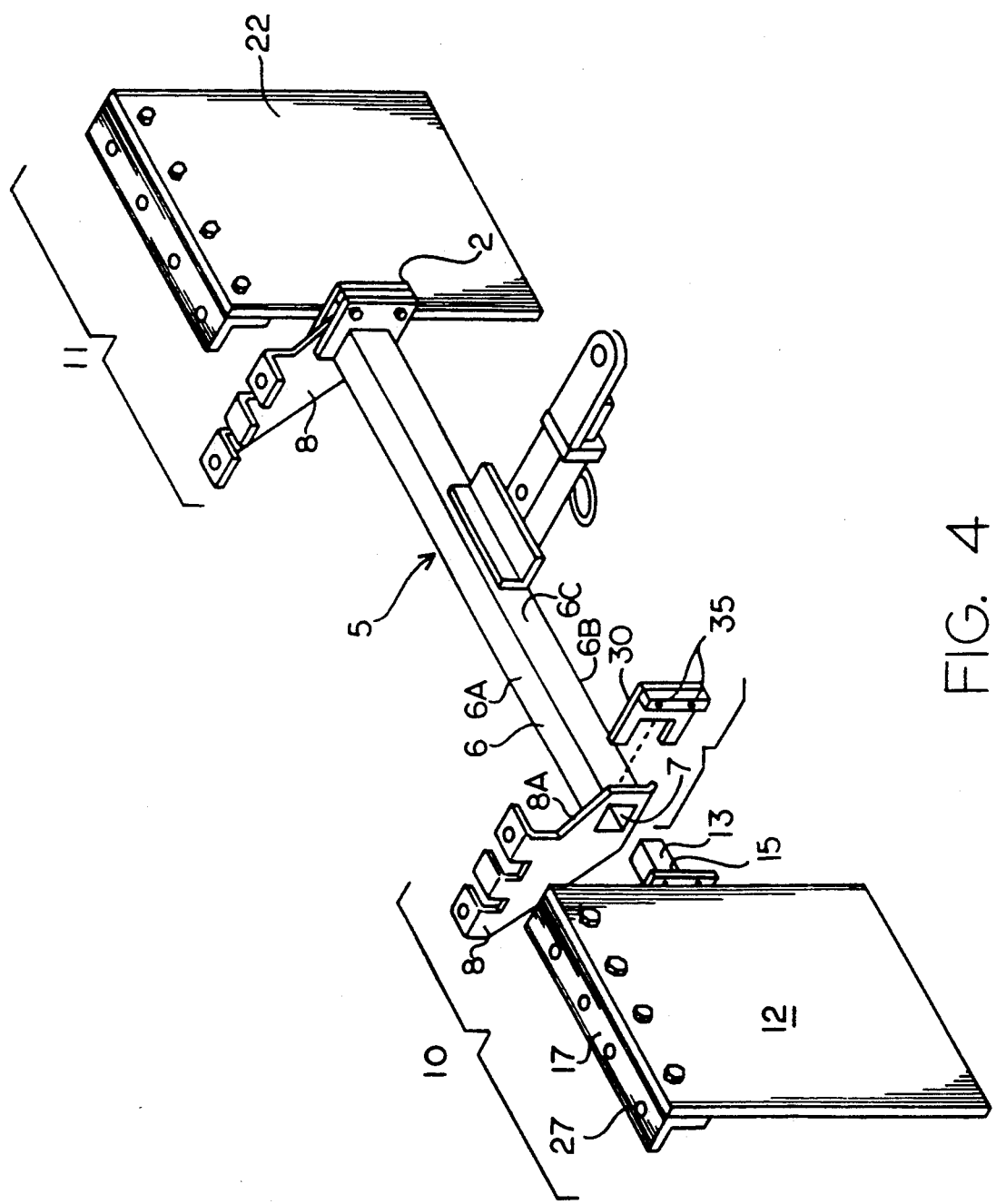
FIG. 4 is an exploded view of the left upright frame member of the first embodiment showing the transverse bar member receiving stub and frame mounting plate with clamping member.

Referring now to FIGS. 3 and 4, the left half of the adjustable position mud flap assembly 10 is shown, with the right L-shaped mud flap frame assembly 11 and right mud flap 22 here being a mirror image construction of the left side assembly.

A typical or standard trailer hitch assembly 5 is shown in FIG. 4 and generally has a transverse bar member 6 attached to and held in place by transverse bar support plates 8 and further secured to the vehicle undercarriage at the rear of the vehicle. There are several different manufacturers and models of trailer hitch assembly, most of which include a hollow open-ended transverse bar member 6, the left end of which is shown at 7 and the right end shown at 2.

FIG. 3 shows left L-shaped mud flap frame 10 which includes a left transverse bar member receiving stub 13, left upright frame member 14, left frame mounting plate 15, and left mud flap mounting member 17. Frame mounting plate 15 has a plurality of annularly spaced holes 16. Left transverse bar member receiving stub 13 is here constructed from a square metal tube having outside dimensions sized to be closely received within hole 7 of square transverse bar member 6. Both the left upright frame member 14 and the left mud flap mounting member 17 are here constructed from angle iron. Left mud flap mounting member 17 is provided with a plurality of mud flap mounting holes 27 for mounting mud flap 12. Advantageously, mud flap mounting holes 27 are positioned on both the planar faces of the angle iron defining left mud flap mounting member 17 insuring that regardless of the radial disposition of left L-shaped mud flap frame 10, there will always be a vertical planar surface on which to mount left mud flap 12.

Figure 5:
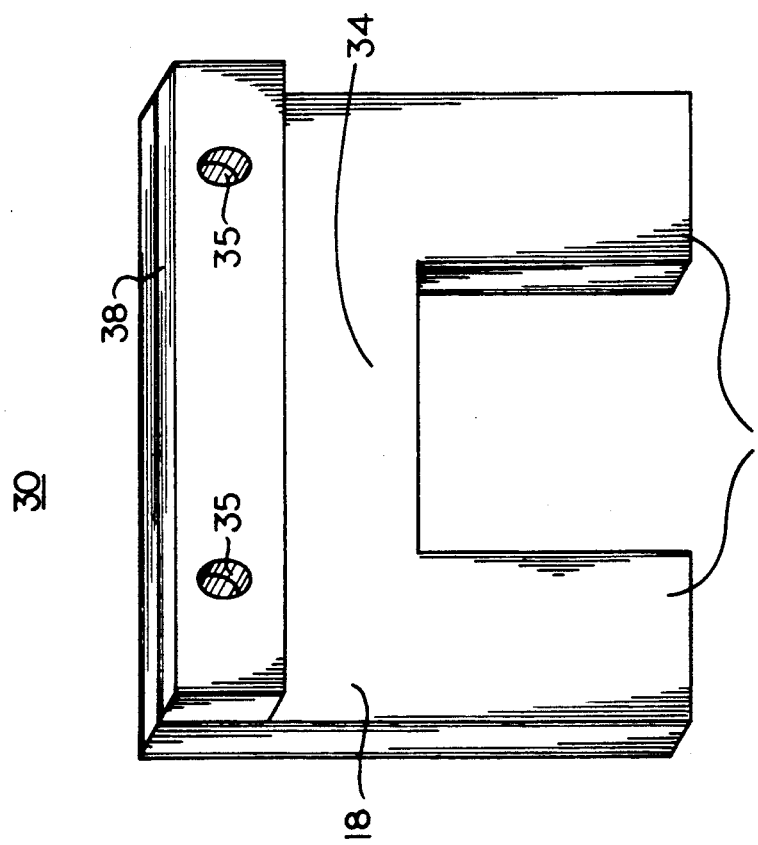
FIG. 5 is a three-quarter elevation view of the first embodiment of the clamping member for the adjustable mud flap assembly.
Figure 7:
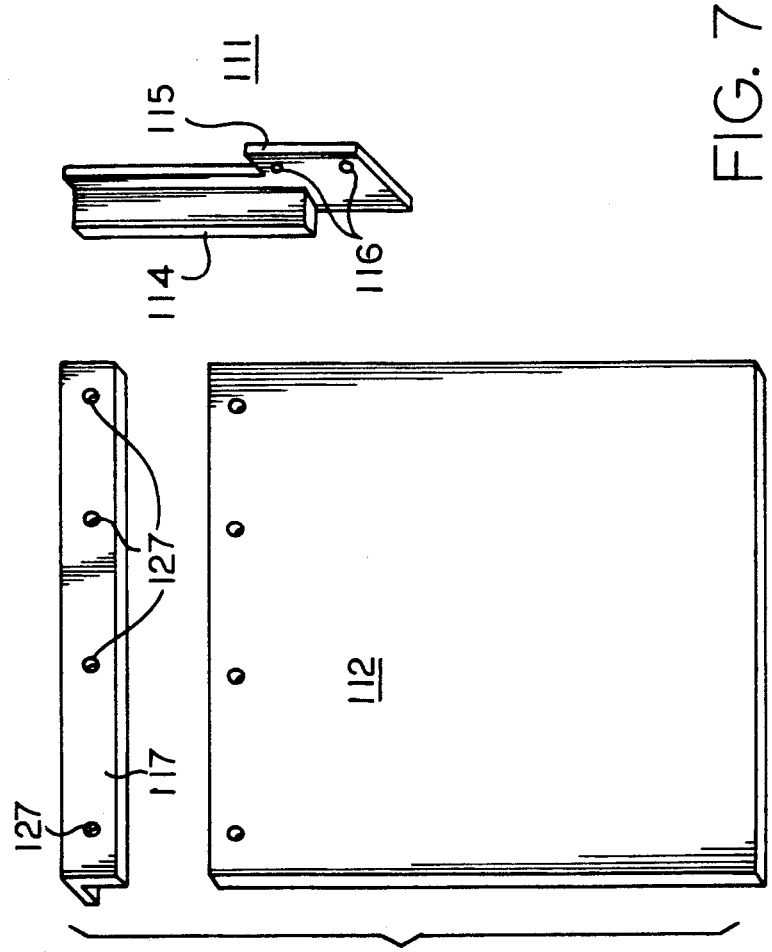
FIG. 7 is an assembly perspective drawing of the second embodiment of the left mud flap frame and mud flap.

As illustrated in FIG. 4, said frame mounting plate 15 and transverse bar receiving stub 13 are held in place by u-shaped clamping member 30, detailed in FIG. 5. U-shaped clamping member 30 has a pair of parallel opposing legs 32 which are integrally formed with a closed rear section 34, thus forming a general u-shape. Attached to rear section 34 is spacer plate 38 for frictional engagement with mounting plate 15. The opposing parallel legs 32 of clamping member 30 straddle the top and bottom horizontal sides 6a and 6b of the hollow square transverse bar member 6, as shown in FIGS. 4 and 6, so that the closed rear section 34 of u-shaped clamping member 30 is flush with, and parallel to, vertical side 6c of hollow square transverse bar member 6 with spacer bar 38 extending out flush with support plate 8.

Figure 6:
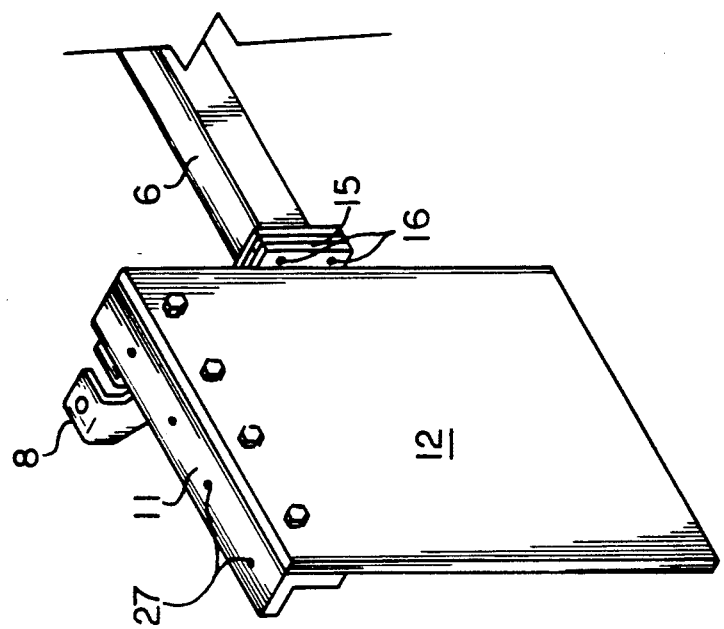
FIG. 6 is a three-quarter elevation view of the first embodiment of the adjustable mud flap assembly and clamping member in place on the transverse bar assembly.

Bolt holes 35 are provided in rear closed section 34 and spacer bar 38 for use in clamping attachment plate 15 to transverse bar support plate 8 by use of nuts and bolts as shown in FIG. 6. By clamping mud flap assembly 10 around transverse bar support plate 8, the need to drill attachment holes in support plate 8 is eliminated and the structural strength and integrity of trailer hitch 5 is not affected.

Referring now to FIGS. 7-10, a second embodiment of adjustable mud flap assembly is shown. For the sake of simplicity, only the detailed construction of the left L-shaped mud flap frame assembly 111 and left mud flap 112 are shown, with the right L-shaped mud flap frame 112 and right mud flap being a mirror image construction of the left side assembly.

Some models of the trailer hitch assembly do not have open ends which extend through the transverse bar support plate 8. As shown in FIG. 8, closed-end transverse bar member 106 is affixed to transverse bar support plates 108. For this particular assembly, the present invention provides clamping assembly 130a and 130b to frictionally engage frame mounting plate 115 around transverse bar support plate 108.

Figure 10:
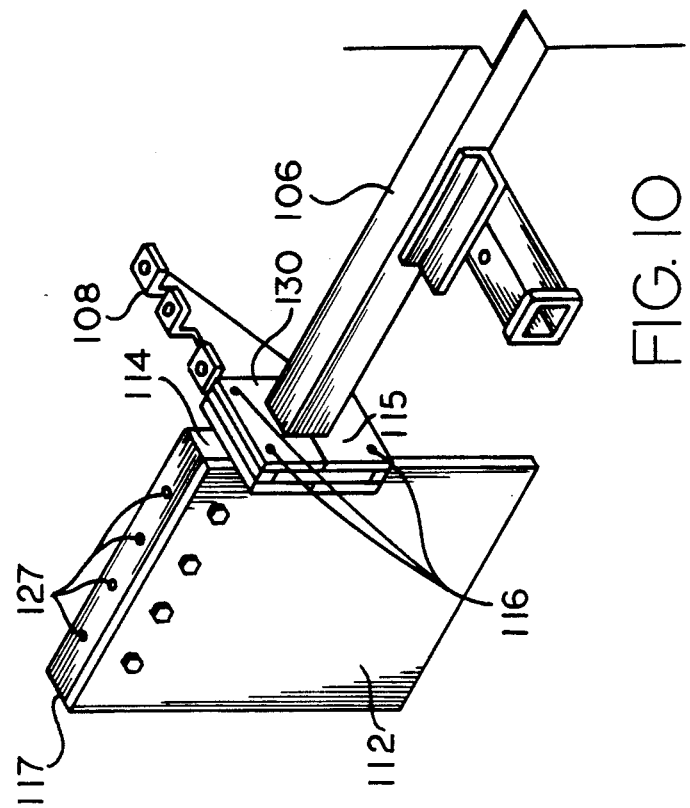
FIG. 10 is a three-quarter elevation view of the second embodiment of the adjustable mud flap assembly and clamping assembly in place on the transverse bar member.
Figure 9:
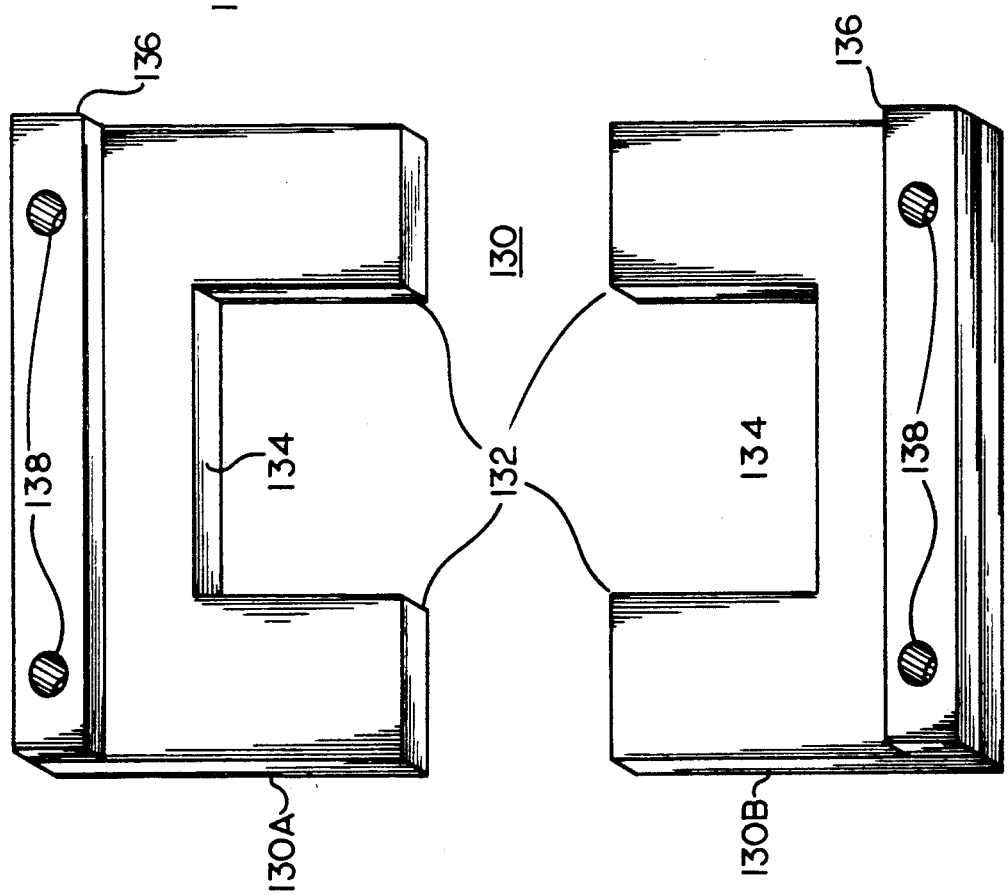
FIG. 9 is a three-quarter view of the clamping assembly of the second embodiment.

Frame mounting plate 115 has a plurality of annularly spaced frame attachment holes 116, and clamping members 130a and 130b each have a pair of parallel opposing legs 132 which are formed integrally with a closed rear section 134. Said clamping members each have a spacer bar 136, attached to rear sections 134, which is of the required thickness to fit flush with the outside surfaces of frame support plates 108 when opposing legs 132 are fitted on opposite sides of the transverse bar member 106 parallel and closely conforming to the inside surfaces of frame support plates 108. Bolt holes 138 are provided in rear closed sections 134 and spacer bars 136 of each of the clamping members 130a and 130b for use in clamping attachment 115 to frame support plates 108 as shown in FIG. 10. Clamping assembly 130 is detailed in FIG. 9.

While there is shown and described the present preferred embodiment of the invention, it is to be distinctly understood that this invention is not limited thereto but may be variously embodied to practice within the scope of the following claims.

I claim:

1. An adjustable mud flap assembly, for use on a vertical having a trailer hitch assembly having a hollow open-ended transverse bar member affixed at the rear underside of the vehicle, said transverse bar member including right and left end openings and further supported by right and left support plates, which comprises:

a pair of mud flaps;

a pair of L shaped mud flap frames each supporting one of said mud flaps by one end of its said L shaped mud flap frame, and at another end of its said L shaped mud flap frame having a transverse bar member receiving stub being sized and shaped for engagement of each of the right and left end openings in the transverse bar member, each mud flap frame being engageable in one end of the transverse bar member in one of a plurality of radial dispositions with respect to the transverse bar member, so that L shaped mud flap frames may maintain said mud flaps in any one of a plurality of vertical planes and heights with respect to the wheel of the vehicle, according to its radial disposition; and removable attachment means to operably removably attach said mud flap frames to the transverse bar member ends while said transverse bar member receiving stubs are engaged, said removable attachment means comprising a U-shaped clamping member with nut and bolt attachment means for frictionally engaging said adjustable mud flap assemblies to the transverse bar supporting plate.

2. An adjustable mud flap assembly, for use on a vehicle having a trailer hitch assembly with a transverse bar member affixed at the rear underside of the vehicle, said transverse bar member not having an open end and further supported by transverse bar support plates, which comprises:
- a pair of mud flaps;
- a pair of L shaped mud flap frames, each supporting one of said mud flaps by one end of its said L shaped mud flap frame, and at another end of its said L shaped mud flap frame having an attachment plate with a plurality of annularly spaced attachment holes;

removable attachment means to operable removable attach said mud flap frames to the transverse bar member in one of a plurality of radial dispositions with respect to the transverse bar member, so that said L shaped mud flap frames may maintain said mud flaps in any one of a plurality of vertical planes and heights with respect to the wheel of the vehicle, according to its radial disposition, said removable attachment means comprising a pair of U-shaped clamping members and a nut and bolt attachment means for frictionally engaging said mud flap frame to the transverse bar support plate.

* * * * *